(12) United States Patent
Trui et al.

(10) Patent No.: US 8,579,714 B2
(45) Date of Patent: Nov. 12, 2013

(54) SPACE ORIENTATING MECHANISM WITH TWO TETRAHEDRONS AND EIGHT ARC-LINKS

(75) Inventors: Wen-Der Trui, Taichung (TW); Shu-Ching Lin, Taichung (TW)

(73) Assignee: TRUI, Wen-Der, Taichung (TW)

( * ) Notice: Subject to any disclaimer, the term of this patent is extended or adjusted under 35 U.S.C. 154(b) by 233 days.

(21) Appl. No.: 13/252,835

(22) Filed: Oct. 4, 2011

(65) Prior Publication Data
US 2012/0083347 A1     Apr. 5, 2012

(30) Foreign Application Priority Data
Oct. 4, 2010  (TW) ................................. 99133765 A

(51) Int. Cl.
*A63G 31/00* (2006.01)
(52) U.S. Cl.
USPC ............................................. 472/59; 472/57
(58) Field of Classification Search
USPC ...................................... 472/57, 59
See application file for complete search history.

(56) References Cited

U.S. PATENT DOCUMENTS

| | | | | | |
|---|---|---|---|---|---|
| 4,824,099 | A | * | 4/1989 | Rusu et al. | 472/3 |
| 5,342,244 | A | * | 8/1994 | Nelson | 472/14 |
| 5,725,435 | A | * | 3/1998 | De Castro Faria | 472/47 |
| 5,759,107 | A | * | 6/1998 | Nagel | 472/47 |
| 6,331,152 | B1 | * | 12/2001 | Holle | 482/4 |
| 7,402,110 | B2 | * | 7/2008 | Casey | 472/47 |
| 7,559,766 | B2 | * | 7/2009 | Epley et al. | 434/34 |
| 8,066,576 | B2 | * | 11/2011 | Threlkel | 472/47 |

* cited by examiner

*Primary Examiner* — Michael Dennis
(74) *Attorney, Agent, or Firm* — Muncy, Geissler, Olds & Lowe, PLLC

(57) ABSTRACT

This new invented mechanism is geometrically defined by two concentric tetrahedrons. Four motors are mounted onto the four vertexes of an outer tetrahedron frame. Four outer arc-links which are driven by these motors are pivotally connected with another four inner arc-links which are pivoted by four vertexes of an inner tetrahedron frame. This mechanism not only extends the range in pitch, roll and yaw three rotational DoF for enlarging the limits of Stewart 6-axis motion platform but also increases two translational DoF for improving the shortage of gimbals type multi-ring mechanism. This mechanism can simulate high maneuvering motion (ex. Barrel roll or fast spin) as high-speed vehicles (ex. fighter or roller coaster) can to stimulate passengers with virtual-but-real and shocked-but-exciting sensation. This mechanism will be chosen as a motion platform or a space orientating mechanism for a theme park game machine or a military fighter trainer.

11 Claims, 16 Drawing Sheets

SPACE ORIENTATING MECHANISM WITH TWO TETRAHEDRONS AND EIGHT ARC-LINKS

BACKGROUND OF THE INVENTION

1. Technical Field

The present invention relates to kinematic linkage systems, and more particularly, to a space orientating mechanism that us configured to simulate high maneuvering motion as those performed by high-speed vehicles (ex. aerial vehicles or playground equipment) so as to stimulate its passengers with virtual-but-real and shock-but-exciting feeling, thus being a suitable motion platform or for military fighter trainers or game machines in theme parks.

2. Description of Related Art

Currently the motion platforms, or referred to as space orientating mechanisms, used in flight trainers or amusement rides are mainly 6-axis Stewart platforms and gimbals type multi-ring mechanisms.

The 6-axis Stewart platform was introduced by Stewart and Gough in 1965, which employs six actuators that are fixed to the ground for positioning and posing a top plate. After years of efforts paid to mechanical and kinetic development thereof, Stewart platforms now are well configured in terms of workspace and attitudinal path and thus can avoid singularities. While a Stewart platform can be moved in six degrees of freedom, namely forward/backward, up/down, left/right, roll, pitch and yaw, the maximum extension of the linear actuator or the hydraulic cylinder driving it is substantially limited to the fixed length, causing the moving range of the payload bay highly confined. Particularly, even with optimized design, the three angles, namely the roll angle, the pitch angle and the yaw angle, are still limited to ±45°. Thus, although the 6-axis Stewart platform has been highly developed in these years, its innate insufficiency remains a problem and makes the Stewart platform less useful to simulate high-maneuvering motion in the three-dimensional space as that performed by high-speed vehicles, such as fighter planes and roller coasters, thereby limiting its application scope limited to airline flight training where only smooth take-off and landing are programmed accompanied with occasional interference caused by gusts.

The gimbals type multi-ring mechanism has been developed for a long time. Its multiple rings permit the payload bay it carries to rotate continuously in large angles. However, since such a mechanism lacks for the translational degrees of freedom for up/down, left/right and forward/backward, it is incompetent when talking about stimulating passengers in the payload bay with sudden, scary vibration and shock. In addition, with motors instead of rotary hydraulic cylinders used to output torque, the mechanism having less payload capacity and inefficient inertia would have its application scope significantly limited.

The defect of such a mechanism is out of the fact that its multiple rings are separately configured. In an instance where motors working with gearboxes are employed as the torque output devices for jointly driving a payload bay mounted on the inner ring, the payload bay is bound to the end of the rolling axle of the inner ring. In order to meet the output requirement for the instantaneous maximum angle, the total inertia of the motor and the gearbox must not be small. Even if direct-drive motors are used when the cost forms no concern, they help less in inertia reduction. Therefore, the motor driving the middle ring has to bear the accumulated inertia of the motor-and-gear assemblies of both the payload bay and the inner ring, or it would fail to drive the middle ring to rotate against the pitch axis. Similarly, the motor driving the outer ring has to bear the accumulated inertia of the motor-and-gear assemblies of the payload bay, the inner ring and the middle ring, or it would fail to drive the outer ring to rotate against the yaw axis.

In this context, each of the rings must have significantly increased diameter to contain the corresponding motor and gearbox, resulting in the workspace of the overall mechanism too large and out of proportion to the payload capacity. In addition, difficulty in electric communication can exist between the motors separately pivoted to the rings, and inter-twisted wires may hinder the operation of the mechanism. For these reasons, the gimbals type multi-ring mechanism is typically hydraulically driven, making it only suitable for the large multi-axis rolling amusement rides in theme parks, or for the anti-G centrifuge training devices specially designed for military use with less limitation to costs.

SUMMARY OF THE INVENTION

The primary objective of the present invention is to provide a space orientating mechanism, which significantly extends the range in three rotational DoF (Degree of Freedom), namely pitch, roll and yaw from the conventional 6-axis Stewart platform, and thus is able to simulate large-angle, high-maneuvering motion in the three-dimensional space as that performed by fighter planes or roller coasters.

Another objective of the present invention is to provide a space orientating mechanism, which increases two and three translational degrees of freedom for improving the shortage of the traditional gimbals type multi-ring mechanism, and providing passengers in the payload bay with virtual-but-real and shock-but-exciting feeling, wherein the mechanism may use motors as a torque source so as to be benefited by the controllability and maintainability of motors opposite to rotary hydraulic cylinders that limit the application of the mechanism to outdoor large amusement rides and military centrifuge training devices, thereby making the mechanism useful to indoor small playgrounds and aeronautical laboratories for physiology, among others.

For achieving the foregoing and other objectives, the present invention can be briefly described as a mechanism having inner and outer tetrahedron frames, pivotally connected with four arc-links assemblies for space orientating a payload bay with at least three rotational degrees of freedom. An outer tetrahedron frame is equipped with four torque output devices. Each output shaft of the torque output device coincides with a concentric vertex axis of an outer tetrahedron frame and is pivotally connected with an arc-link assembly. These four arc-link assemblies are then pivotally connected with the concentric vertex axes onto an inner tetrahedron frame, so that a payload bay can be installed therein. In the present invention, the inner tetrahedron frame may be realized by either a fixed structure or a movable structure for providing alternative functions. For the structures, features, geometric definitions, and configurations of their components will be described separately for illustration.

BRIEF DESCRIPTION OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE INVENTION

Figure 1:
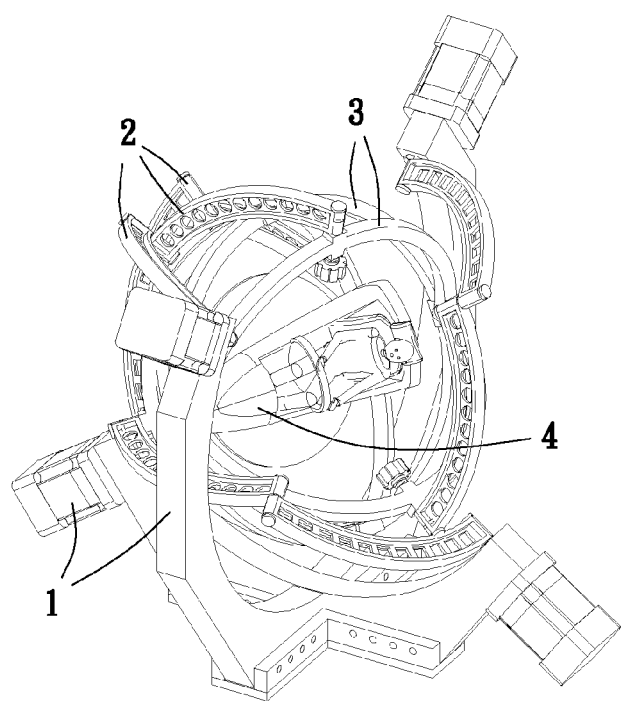
FIG. 1 is an assembled view of a space orientating mechanism with two tetrahedrons and eight arc-links according to the present invention.
Figure 2:
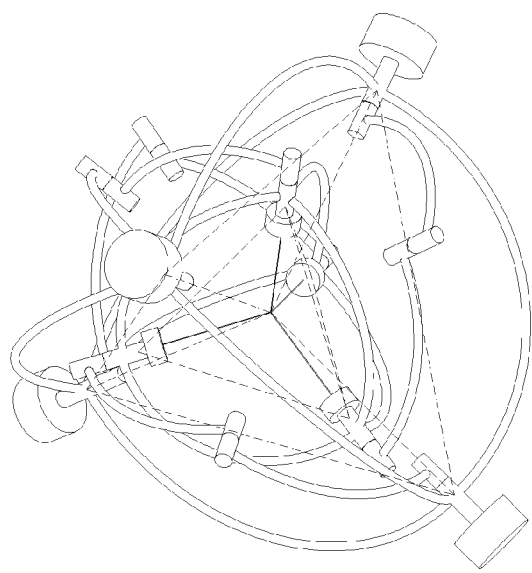
FIG. 2 shows the geometric definition of the space orientating mechanism of FIG. 1.

The mechanism of the present invention has the configuration as shown in FIG. 1, with the geometric definition as reflected in FIG. 2. For both of the structures, the features, geometric definitions and configurations of their components will be described separately for illustration.

Figure 3:
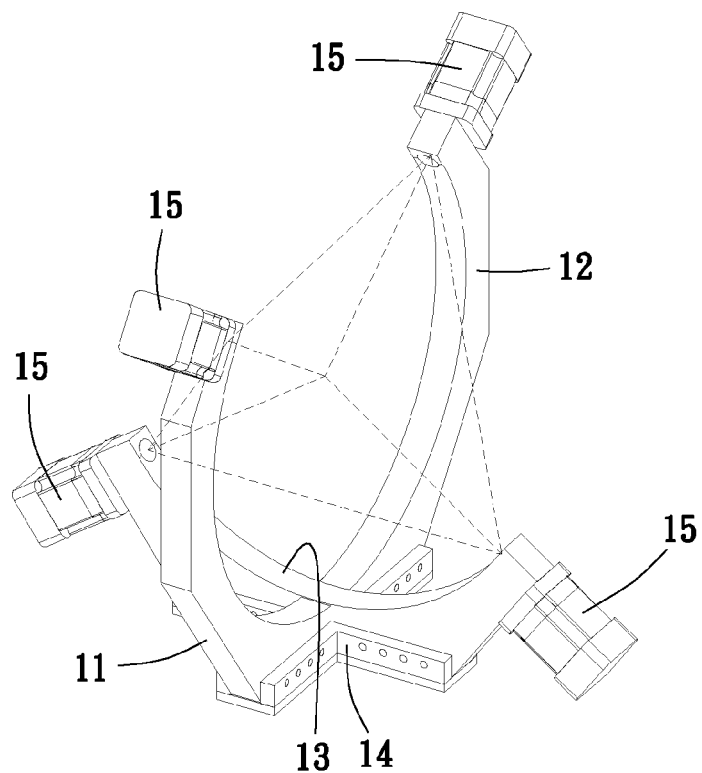
FIG. 3 is a schematic drawing of an outer tetrahedron frame of the space orientating mechanism.

The disclosed mechanism has an outer tetrahedron frame (hereinafter also referred to as the outer frame), on which the four motors are fixedly mounted. The torque output devices shafted on the outer tetrahedron frame can be electric motors, hydraulic actuator or pneumatic actuator, but motors are advantageous for being easy to operate and maintain, hereinafter the torque output devices are collectively referred to as the motors. The outer frame may be composed of a left arc-bracket 11, a right arc-bracket 12, a lower arc-bracket 13, a cross bracket 14 and four motors 15, as shown in FIG. 3.

Figure 4:
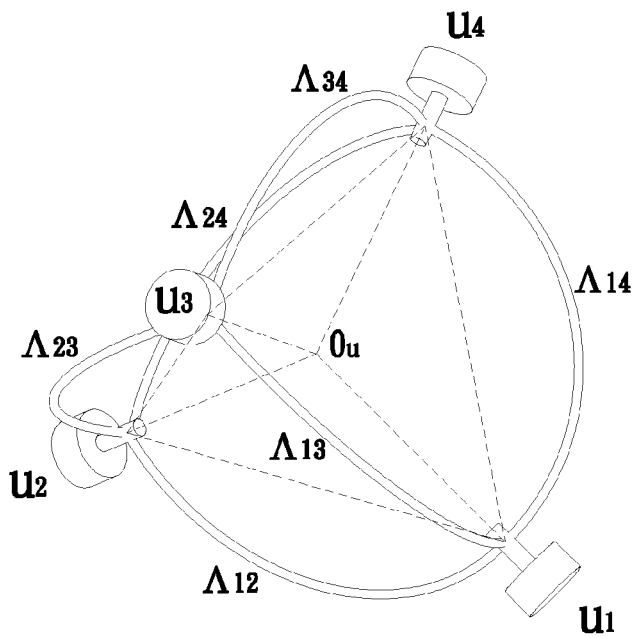
FIG. 4 shows the geometric definition of the outer tetrahedron frame of FIG. 3.

The outer tetrahedron frame has such a geometric definition that the four vertexes of the outer tetrahedron are equally distant from the notional center of outer tetrahedron, and the shafts of the motors coincide with the concentric vertex axes of the outer tetrahedron frame, as shown in FIG. 4. The notional center of the outer tetrahedron is denoted by $o_u$, and concentric vertex axes of the outer tetrahedron are each denoted by $u_i$ (i=1~4), while the included angle between the concentric vertex axis $u_i$ and the other concentric vertex axis $u_j$ is represented as $\Omega_{ij}=\cos^{-1}[u_i \cdot u_j]$, (i,j=1~4; i≠j). If the outer frame is shaped as a regular tetrahedron, due to its simple and symmetry, the outer frame may be easily designed and simulated. Therefore, the six included angles defined by each pair of concentric vertex axes of outer frame are equal, approximately as 109.5°, or: $\Lambda_{12}=\Lambda_{13}=\Lambda_{14}=\Lambda_{23}=\Lambda_{24}=\Lambda_{34}\cong 109.5°$. However, it is to be noted that the regular tetrahedron is a configuration most likely to have singularity. For avoiding singularity, these six included angles may be different.

Figure 5:
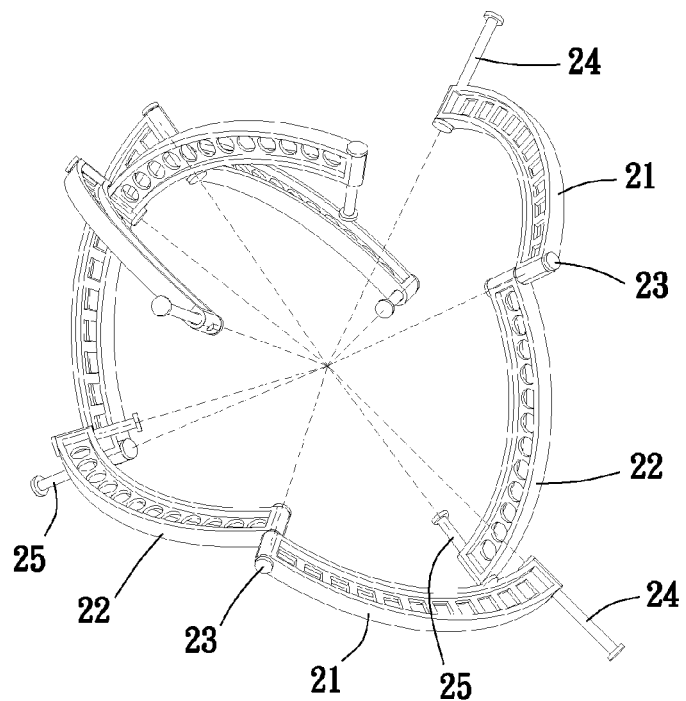
FIG. 5 is a schematic drawing of four arc-link assemblies of the space orientating mechanism.
Figure 6:
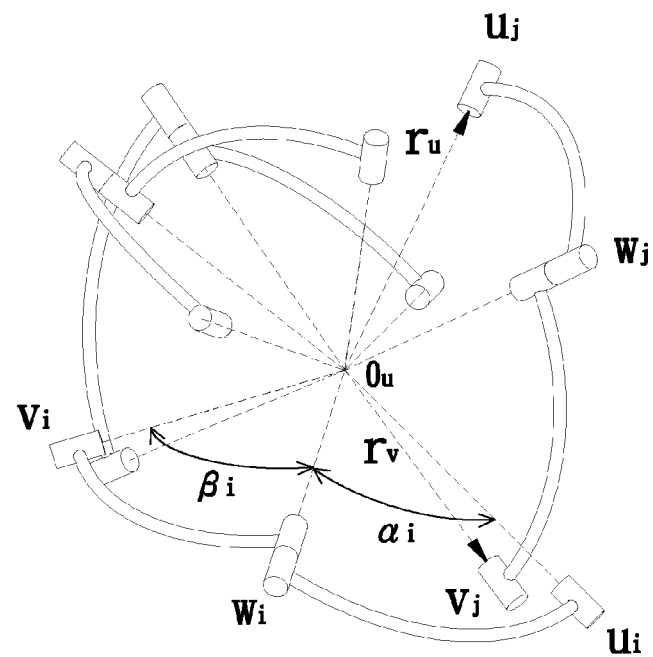
FIG. 6 shows the geometric definition of the four arc-link assemblies of FIG. 5.

The four arc-link assemblies 2 serve to transfer torques from the four torque output devices to the inner tetrahedron frame. Each arc-link assembly is composed of an outer arc-link 21 and an inner arc-link 22 jointed mutually with a joint axle 23. The outer arc-link 21 has its outer end pivoted with each output shaft and torque output device through an outer axle 24, while the inner arc-link 22 has its inner end pivoted with a bearing seat onto the inner tetrahedron frame through an inner axle 25, as shown in FIG. 5. The arc-link assembly has such a geometric definition that the four outer arc-links have equal radiuses and the inner arc-links have equal radiuses. In the assemblies, the axes of the outer arc-links must be concentric. In other words, in the four assemblies, no matter how the middle and outer axles move in response to the posture variation of the inner frame, they must point to the notional center of the outer tetrahedron frame, as shown in FIG. 6. The $i^{th}$ outer axle is represented by the unit vector $u_i$, and the $i^{th}$ joint axle is represented by the unit vector $w_i$, while the $i^{th}$ inner axle is represented by the unit vector $v_i$. The four outer arc-links have their radiuses denoted by $r_u$, and the four inner arc-links have their radiuses denoted by $r_v$. For avoiding singularity, the four outer arc-links may be different in arc-length. The arc-length of the $i^{th}$ outer arc-link is represented by $\alpha_i$, and is defined as a sector included by the $i^{th}$ outer axle and the $i^{th}$ joint axle, also expressible as: $\alpha_i=\cos^{-1}[u_i \cdot w_i]$. For avoiding singularity, the four inner arc-links may be different in arc-length. The arc-length of the $i^{th}$ inner arc-link is represented by $\beta_i$, and is defined as a sector included by the $i^{th}$ inner axle and the $i^{th}$ joint axle, also expressible as: $\beta_i=\cos^{-1}[v_i \cdot w_i]$.

Figure 7:
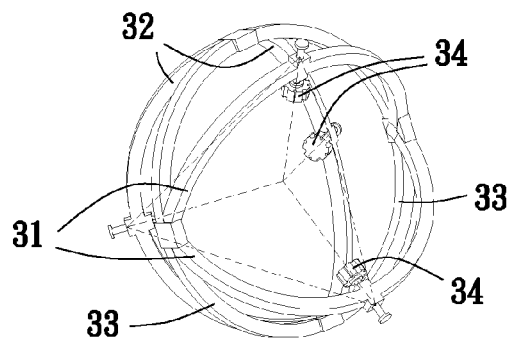
FIG. 7 is a schematic drawing of a fixed inner tetrahedron frame of the space orientating mechanism.

The inner tetrahedron frame (hereinafter also referred to as the inner frame) may be of a fixed structure or a movable structure. The fixed inner frame collects the output of the four motors transferred by the four arc-link assemblies, so as to collectively reflect the output into the desired motion and posture of the payload bay. The four inner arc-links are pivotally connected to the four bearing seats at the four vertexes of the inner frame. An upper dome 31 has its east-west semi-circle welded with the south and north ends of a central circle 33. A lower dome 32 has its north-south semi-circle welded with the east and west ends of the central circle 33. The bearing seats atop the four semi-circle are connected in series to four angle detectors 34 (e.g. optical encoders) for measuring the variation in angle between the inner arc-links and the semi-circles, for identifying the posture of the payload bay, as shown in FIG. 7.

Figure 8:
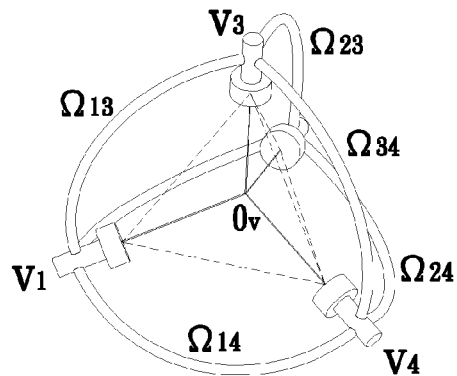
FIG. 8 shows the geometric definition of the fixed inner tetrahedron frame of FIG. 7.

The fixed inner frame has such a geometric definition that the four vertexes of the inner tetrahedron are equally distant from the notional center of the inner tetrahedron, and the four bearing seats pivot into the four concentric vertex axes of the inner tetrahedron, respectively. In the four assemblies, since the axes of the outer arc-links are concentric, the notional center of the inner tetrahedron frame and the notional center of the outer tetrahedron frame must coincide with each other, as shown in FIG. 8. The notional center of the inner tetrahedron is denoted by $o_v$, and the concentric vertex axes of the inner tetrahedron are each denoted by $v_i$ (i=1~4), while the included angle between the concentric vertex axis $v_i$ and the other concentric vertex axis $v_j$ is represented as $\Omega_{ij}=\cos^{-1}[v_i \cdot v_j]$, (i,j=1~4; i≠j). If the inner frame is shaped as a regular tetrahedron, due to its simple and symmetry, the inner frame may be easily designed and simulated. Therefore, the six included angles defined by each pair of concentric vertex axes of inner frame are equal, approximately as 109.5°, or: $\Omega_{12}=\Omega_{13}=\Omega_{14}=\Omega_{23}=\Omega_{24}=\Omega_{34}\cong 109.5°$. However, it is to be noted that the regular tetrahedron is a configuration most likely to have singularity. For avoiding singularity, these six included angles may be different.

Figure 10:
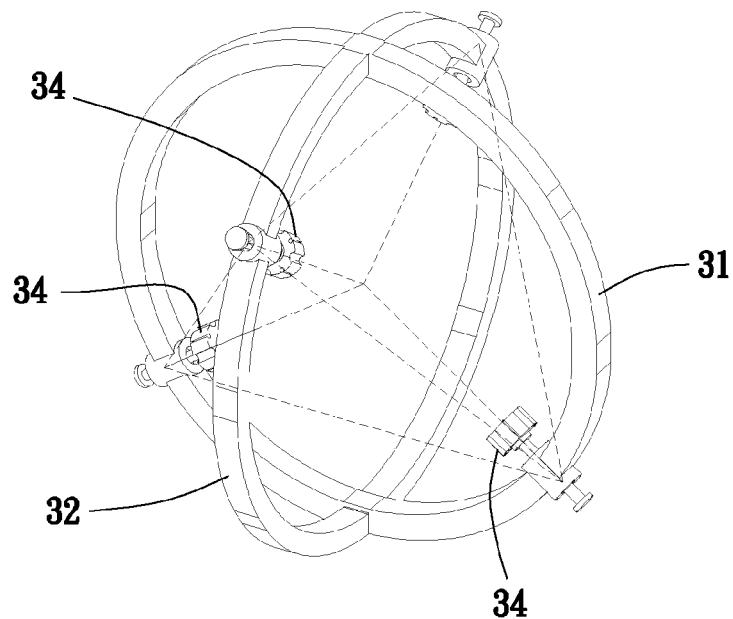
FIG. 10 shows one geometric definition applicable to both the inner frame and the outer frame.
Figure 11:
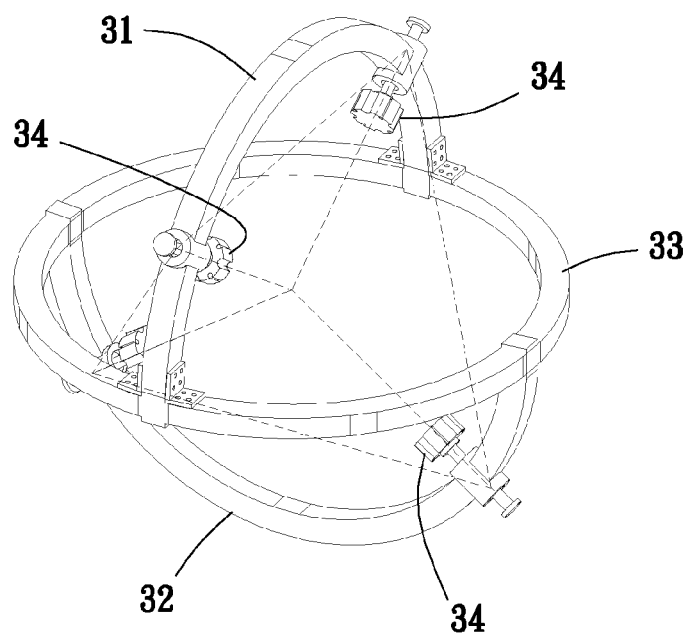
FIG. 11 shows an alternative geometric definition applicable to both the inner frame and the outer frame.

The useful design must provide the required function of the fixed inner frame or outer frame with the specified geometric definition so may include those shown in FIG. 10 or FIG. 11. Similarly, the outer frame may be shaped so.

Figure 12:
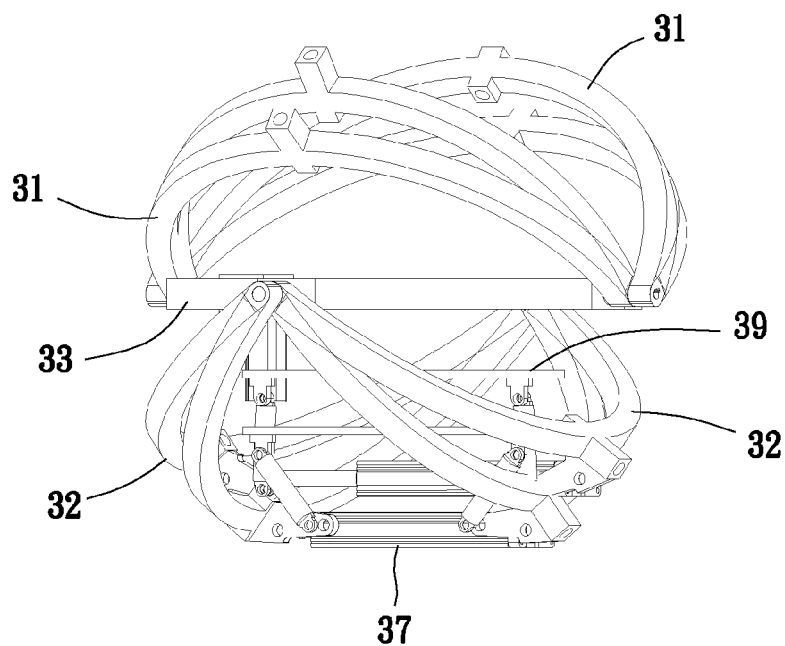
FIG. 12 is a movable inner frame wherein the included angles between any two concentric vertex axes of the tetrahedron are flexible.
Figure 13:
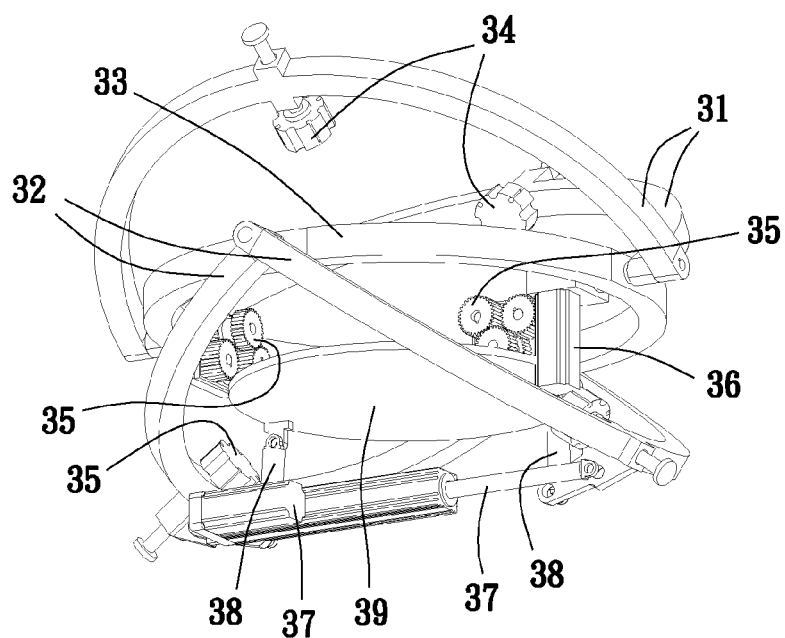
FIG. 13 is a flexible inner tetrahedron frame in its extended position.
Figure 14:
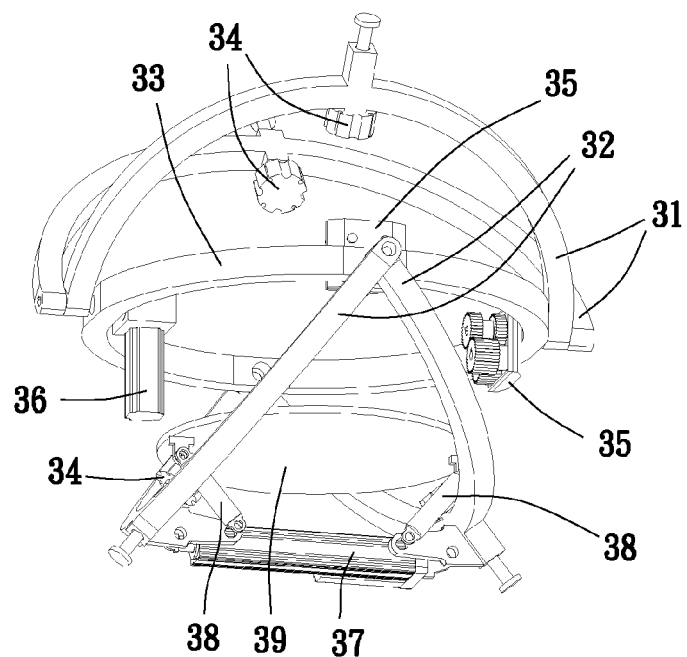
FIG. 14 is a flexible inner tetrahedron frame in its retracted position.
Figure 15:
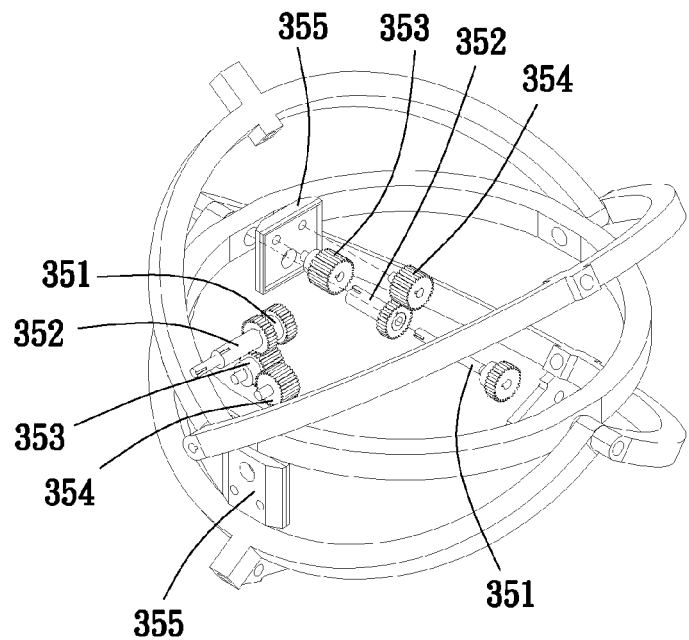
FIG. 15 illustrates the configuration of a reverse simultaneous gearbox.

The movable inner frame assembly inherits the functions and geometric definition of the fixed inner frame, but is added with features that facilitate movable structure. The movable inner frame has such a geometric definition that the included angles between each pair of concentric vertex axes of inner tetrahedron frame are variable. The included angle of the lower dome is determined by the travel distance of the linear actuator (or the motor and gearbox), and the included angle of the upper dome is determined by the output angle of the motor and gearbox (or the linear actuator), as shown in FIG. 12. The movable inner frame is relatively complicated in configuration as it is structurally flexible, as can be seen in FIG. 13 and FIG. 14. The four inner arc-links are pivotally connected to the bearing seats at the four vertexes of the inner frame. The upper dome 31 has its inner and outer semi-circles pivotally connected to the north-south axis of the central circle 33, and the lower dome 32 has its inner and outer semi-circles pivotally connected to the east-west axis of the central circle 33. The bearing seats atop the four semi-circle are pivoted in series to four angle detector 34 (e.g. an optical encoder) for measuring the variation in angle between the inner arc-links and the semi-circles. Two reverse simultaneous gearboxes 35 are provided at one side of each joints. The reverse simultaneous gearboxes 35 includes an outer-frame coaxial gear 351 pivoted to the outer semi-circle and an inner-frame coaxial gear 352 pivoted to the inner semi-circle, which is engaged successively with a first counter gear 353, and a second counter gear 354. After two counter rotations equal to a forward rotation, the motion of the gearbox is completed by the engagement of the second counter gear 35 and the outer-frame coaxial gear 351. The assembled gears are enclosed by a housing 355, as shown in FIG. 15. While the above components and configuration may be one way to realize the reverse simultaneous gearbox, other similar devices capable of driving the symmetrical motions of the right and left semi-circles may be useful. The upper dome 31, when driven by the motor and gearbox 46 (or the hydraulic swing clamp cylinder), is ensured with reverse, simultaneous motion with respect to the east-west longitudinal plane. The lower dome 32, when actuated by the linear actuator 37 (or the hydraulic cylinder) is ensured with reverse, simultaneous motion with respect to the north-south longitudinal plane. The linear actuator has two ends pivotally connected to the extension board of the lower dome 32. Each said end is equipped with a damper link 38. The damper links 38 uphold a bay floor 39. When the linear actuator 37 is activated and drives the lower dome 32, the included angles between the concentric vertex axes of the inner tetrahedron frame change, and the bay floor 39 moves vertically as the pitch angles of the damper links 38 change. Although the movable structure is capable, as it is much more complicated than the fixed structure, the load and capacity of the payload bay have to be compromised. If the upper dome uses the linear actuator instead of the motor and gearbox, translational degrees of freedom for forward/backward and left/right can be obtained, yet the load and capacity of the payload bay will be further reduced. After all, as an option, the movable inner frame has two more translational degrees of freedom as compared with the fixed inner frame that only has three rotational degrees of freedom.

Figure 9:
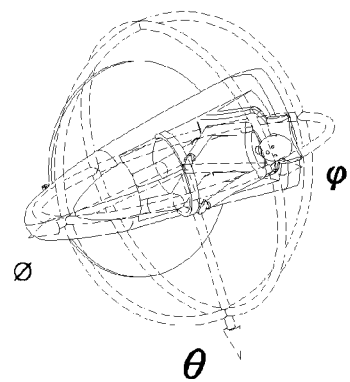
FIG. 9 depicts a payload bay in the fixed inner tetrahedron frame.

The payload bay is configured to simulate a cockpit of an aircraft, such as a fighter plane, or a seat of an amusement ride, such as a roller coaster. When installed in the fixed inner frame, the payload bay can provide its passengers with a roll angle $\Phi$, a pitch angle $\theta$, and a yaw angle $\phi$, indicated as dash line in FIG. 9. While a single one-seat payload bay is depicted in the drawings, the inner frame in fact can carry one payload bay with multiple seats or multiple payload bays with multiple seats, as long as the inner frame and/or even the entire mechanism are scaled up correspondingly. The payload bay can be designed for carrying human, devices and animals. Said devices may include various detection equipment such as an infrared seeker or a radar, so as to act as a vehicle carrying a calibrator or tester for instruments. When animals are carried in the payload bay, spatial reorientation tests may be performed to build a database of aeronautical physiological data.

In the present invention, the payload bay is installed in the inner frame, and the four arc-link assemblies serve to transmit the output of the four motors fixed to the outer frame. With the concentric vertex axes of the outer frame, by introducing the desired new attitude of the payload bay (i.e. the roll angle $\Phi$, the pitch angle $\theta$ and the yaw angle $\phi$) into the Euler angle conversion matrix, then the concentric vertex axes of the inner frame can be obtained. According to the previous torque output and the readings of the four angle detectors, estimation of four included angles between the inner and outer arc-links can be made, from which the vector of the joint axle $w_i$ can be estimate. The kinematic equations for the inner, middle and outer axes are converted into a simultaneous polynomial. By iteratively inputting the given or estimated parameters to this simultaneous polynomial, the ideal value of the torque output of the four motors can be obtained with carefully selected numerals.

The space requirement of the payload bay dominates the size of the inner frame, and in turn dominates the distance from the notional center to the vertexes in the inner tetrahedron frame. Plus the space required by the bearing seats and the angle detectors, the radius $r_v$ of the inner arc-links can be determined. As concentricity of the axes is the essential factor of the present invention, the greater difference between the radiuses of the inner and outer arc-links (i.e. $r_u$-$r_v$) better ensures the geometric concentricity of the inner, middle and outer axes. Nevertheless, the greater the parameter is, the greater the radial torque is. As the radial torque is less bearable to a motor as compared with the axial torque, for setting the radius of the outer arc-link $r_u$, the balance between the geometric concentricity of the axes and the maximum radial torque bearable to the motor shall be obtained.

Challenges for implementing the present invention are not related to how to control the output of the motors for posing the payload bay as required and how to match motor torque with the inertia of the payload bay so as to meet the kinetic requirement. The issue is how to make the four arc-link assemblies operate smoothly without mutual interference or, in other words, how to avoid interference and singularity. The following description is directed to the interference and singularity avoidance approaches may happen in the present invention for designers to consider when contemplating practical design.

Figure 16:
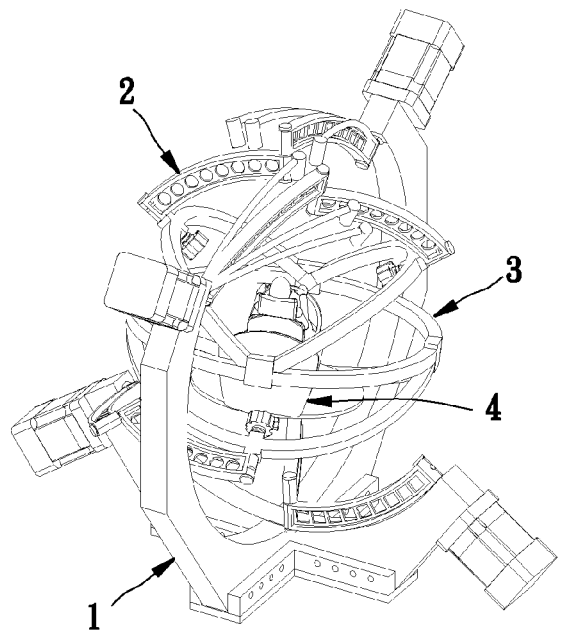
FIG. 16 illustrates interference avoidance between any two arc-links.

(I) Interference: this term refers to a situation where one travel path of one arc-link is hindered by another arc-link. By making the sum of the arc-lengths of any two of the outer arc-links equal to the included angle between the two concentric vertex axes of the outer frame, namely: $\alpha_i+\alpha_j=\Lambda_{ij}$ (i,j=1~4; i≠j), the two outer arc-links can be fully prevented from interference during their respective operation, as shown in FIG. 16. Similarly, by making the sum of the arc-lengths of any two of the inner arc-links equal to the included angle between the two concentric vertex axes of the inner frame, namely: $\beta_i+\beta_j=\Omega_{ij}$, the two inner arc-links can be fully prevented from interference during their respective operation. However, when the sum of the arc-lengths of any two of the outer or inner arc-links comes to the minimum, the moving space of the payload bay is minimized.

It is therefore learned that the sum of the arc-lengths of any two of the outer arc-links must be greater than the included angle between their corresponding concentric vertex axes of the outer frame, namely: $\alpha_i+\alpha_j\geq\Lambda_{ij}$. For easily understood, the outer tetrahedron frame may be assumed as a regular tetrahedron, therefore the sum of the arc-lengths of any two of the outer arc-links must be greater than 109.5°. The sum of the arc-lengths of any two of the inner arc-links must be greater than the included angle between each pair of concentric vertex axes of the inner frame, namely: $\beta_i+\beta_j\geq\Omega_{ij}$. For easily understood, the inner tetrahedron frame may be assumed as a regular tetrahedron, therefore the sum of the arc-lengths of any two of the inner arc-links must be greater than 109.5°.

Figure 17:
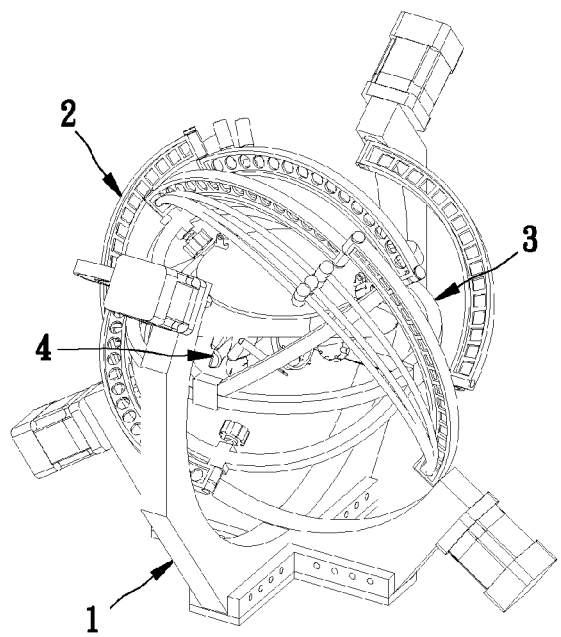
FIG. 17 illustrates the singularity and interference between the two concentric vertex axes.

According to mechanical geometry, the sum of arc-length of any inner arc-link and the corresponding outer arc-link must not be greater than 180°, or the design is out of sense, namely: $\alpha_i+\beta_i\not>180°$(i=1~4). Without considering physical structure, we can say when the sum of the arc-length of the inner and outer arc-links in all the four assemblies is equal to 180°; the payload bay has the maximum angular range in each DoF. Yet, the physical structure has always to be considered. At this time, the interference is most likely to happen, and therefore the moving space of the payload bay is minimized, as shown in FIG. 17. Thus we can learn that the sum of arc-length of any inner arc-link and the corresponding outer arc-link must be smaller or equal to 180°, namely: $\alpha_i+\beta_i\leq180°$.

To sum up, it is impossible to avoid interference without brining limitation to the moving space of the payload bay. The practical approach is to consider the moving requirements of the vehicle to be simulated and figure out the optimal combination that best avoids interference through simulation. There is not an absolutely optimal parameter design.

(II) Singularity: this term refers to the situation where the torque output of any motor fails to be fully conveyed to and thereby move the corresponding vertex of the inner frame as designed. Singularity may include single-axle fold singularity, two-axle joint singularity and four-axle joint singularity. The prerequisite of single-axle fold singularity is that in the $i^{th}$ set, the sum of the arc-length of inner arc-links and the sum of the arc-length of outer arc-links are equal, namely $\alpha_i=\beta_i$ (i=1~4). When the $i^{th}$ concentric vertex axis of the inner frame and the $i^{th}$ concentric vertex axis of outer frame coincide, i.e. $u_i=v_i$. Single-axle fold singularity is not a big problem, because there are still three motors working normally in addition to the failed one, and thus the payload bay can be properly positioned.

Two-axle joint singularity refers to the situation where the failure in fully conveying of output happens to two motors, as shown in FIG. 17. This can only happen when there are two sets of the inner and outer arc-links having the same sum of the arc-lengths, namely 180°, or $\alpha_i+\beta_i=\alpha_j+\beta_j=180°$(ij=1~4; i≠j). When happening to the $i^{th}$ and $j^{th}$ concentric vertex axis of the inner frame connected with the $i^{th}$ and $j^{th}$ concentric vertex axis of the outer frame, i.e. $u_i=-v_i$; $u_j=-v_j$. At this time, no matter how much power the two motors input, they will not be actuated the two vertexes of the inner frame they are connected to. Even though the other two motors are actuated, their output is not sufficient to pose the payload bay as designed. Fortunately, this problem can be easily avoided by eliminated the prerequisite in the process of parameter design. That is, to make $\alpha_i+\beta_i\neq180°$. By incorporating this with the foregoing equations, it is obtained that the sum of the arc-lengths of the corresponding inner and outer arc-links must be smaller than 180°, namely $\alpha_i+\beta_i<180°$.

Figure 18:
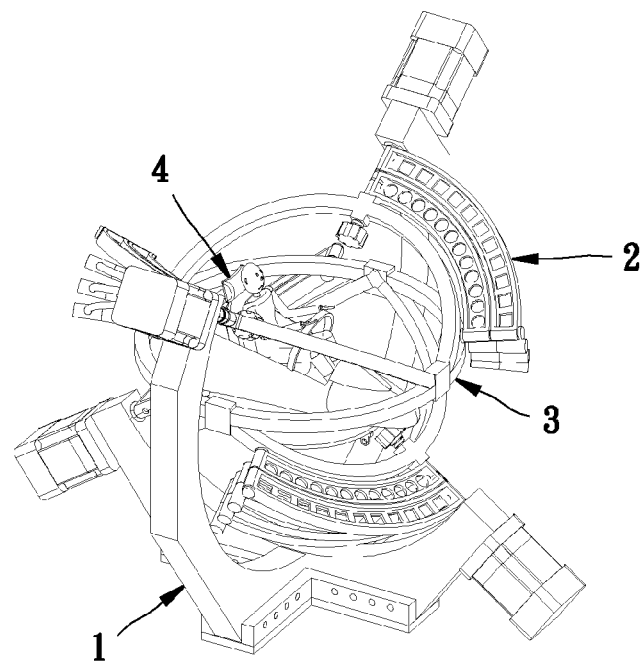
FIG. 18 illustrates four-axle fold singularity happening to the fixed inner frame.

The most unbeatable problem is four-axle fold singularity. The prerequisite is that each pair of the corresponding inner and outer arc-links have the same arc-length, namely $\alpha_1=\beta_1$; $\alpha_2=\beta_2$; $\alpha_3=\beta_3$; $\alpha_4=\beta_4$. When happening to the four concentric vertex axes of the inner frame coincide with the four concentric vertex axes of the outer frame, it is $u_1=v_1$; $u_2=v_2$; $u_3=v_3$; $u_4=v_4$, as shown in FIG. 18. At this time, no matter how much power the two motors input, they can not actuate the four vertexes of the inner frame. Since four-axle fold singularity always happens when the mechanism is at the notional center and once the mechanism is trapped, it is difficult to escape. Unfortunately, the central position can not be avoided because it is the vital part for the processes of both initialization and return. There are three approaches to eliminate the prerequisite during parameter design.

Figure 19:
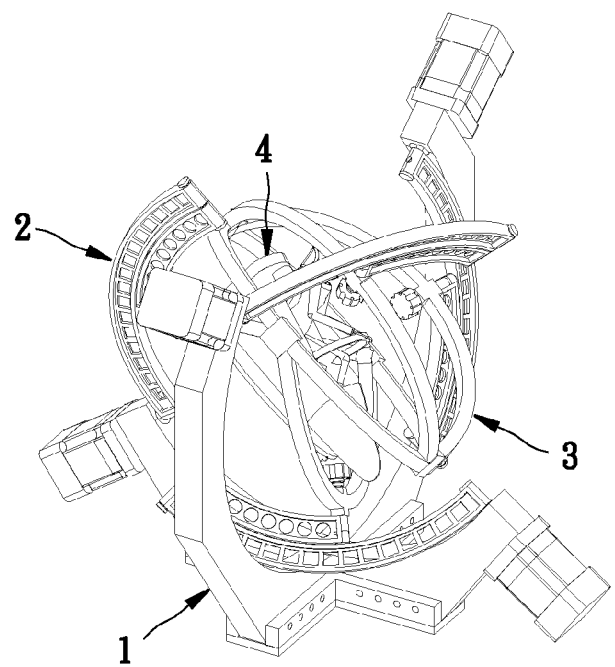
FIG. 19 illustrates avoidance of four-axle fold singularity in the fixed inner frame.

Approach I: This method is, as mentioned previously, to prevent the four pairs of the corresponding inner and outer arc-links having equal arc-lengths, namely: $\alpha_i\neq\beta_i$. As greater the difference between the arc-lengths of the inner and outer arc-links is, when the four pairs of inner and outer arc-links fully folded, the larger the equivalent lever arms controllable to the four motors are, and the easier the escape is, as shown in FIG. 19. However, as the difference between the arc-lengths increases, the moving space of the payload bay reduces.

Approach II: This method is to make the six included angles between their corresponding concentric vertex axes of the inner frame being different and/or to make the six included angles between their corresponding concentric vertex axes of the outer frame being different, that is, making neither the inner frame nor the outer tetrahedron frame to be a regular tetrahedron because singularity is most likely to happen in a regular tetrahedron structure. However, simple and symmetry of a regular tetrahedron are easier to design and simulate. As it is impossible to be complete in both respects, how to avoid singularity by properly setting the arc-lengths of the inner and outer arc-links and the included angles between the two concentric vertex axes of the inner and outer frames is the dilemma when the present invention is implemented in a fixed inner frame.

Figure 20:
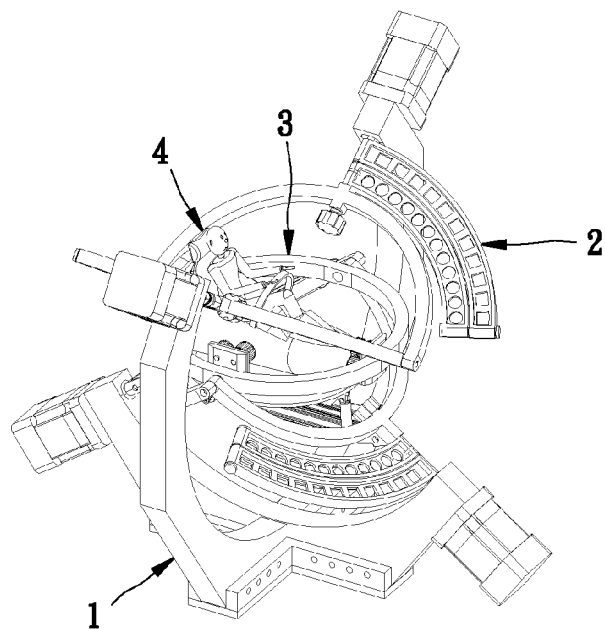
FIG. 20 illustrates the movable inner frame getting trapped by four-axle fold singularity.
Figure 21:
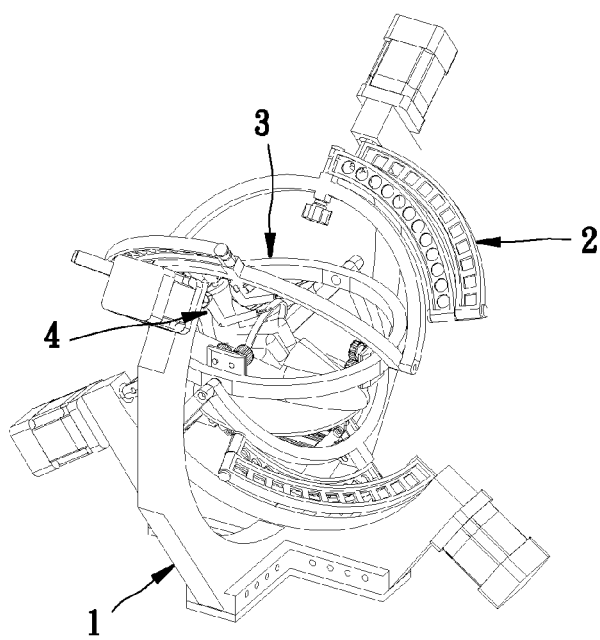
FIG. 21 illustrates the movable inner frame escaping from four-axle fold singularity.

Approach III: This method is to prevent the four concentric vertex axes of the inner frame from all coinciding with the four concentric vertex axes of the outer frame. This is the starting point of the modification of the movable inner frame. When four-axle fold singularity takes place, as shown in FIG. 20, the motor and gearbox drive the included angle of the upper semi-circle, and the linear actuator drives the included angle of the lower semi-circle, thereby jointly changing the geometric definition of the inner tetrahedron frame, and in turn forcing the four concentric vertex axes of the inner frame from all coinciding with the four concentric vertex axes of the outer frame. At this time, the four pairs of the inner and outer arc-links are not fully folded, thereby the included angles expanding. The accompanying equivalent lever arms thus facilitate the transmission of the motor torque, and the mechanism can gradually escape from the central position where four-axle fold singularity happens, as shown in FIG. 21. As a result, the movable inner frame is superior to the fixed inner frame for not only having two additional translational degrees of freedom, but also being more capable of escaping from four-axle fold singularity.

To sum up, either the compact fixed inner frame or the complicated movable inner frame proposed by the present invention has successfully overcome the limitations of the 6-axis Stewart platform and the gimbals type multi-ring mechanism. Also, the present invention has explicitly analyzed the potential challenge related to interference and singularity, and provides information as useful reference for designers to choosing the optimal combinations of the parameters according to practical needs, so as to ensure the applicability of the present invention as a motion platform or space orientating mechanism for various flight trainers and game machines in theme parks.

In addition to the aforementioned embodiments, the components used in the present invention may have the following improvements.

Figure 22:
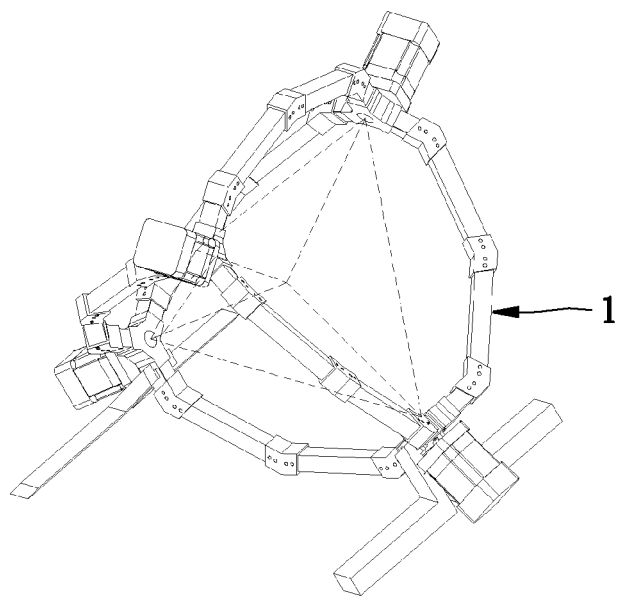
FIG. 22 is a schematic drawing of another outer tetrahedron frame according to the present invention.
Figure 23:
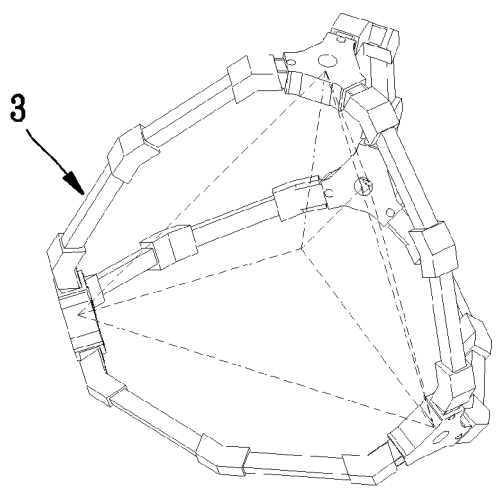
FIG. 23 is a schematic drawing of another inner tetrahedron frame according to the present invention.

First, basing on the above embodiments of the disclosed space orientating mechanism, the outer tetrahedron frame 1 may be alternatively formed as six-bracket frame, as shown in FIG. 22. Similarly, the inner tetrahedron frame 3 may be alternatively formed as six-bracket frame, as shown in FIG. 23.

Figure 24:
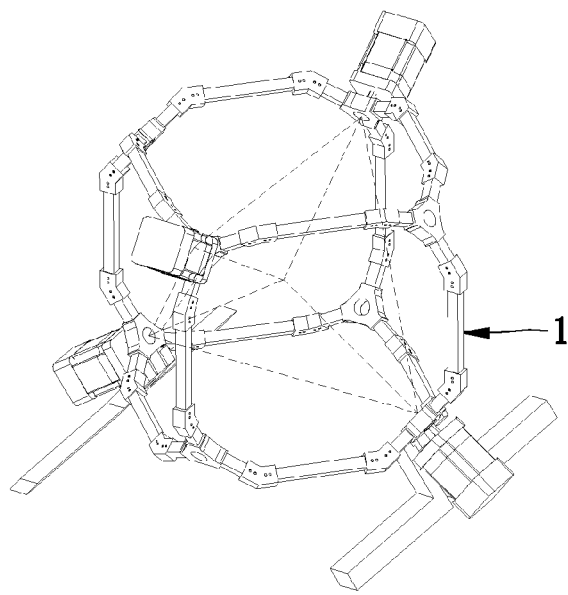
FIG. 24 is a schematic drawing of still another outer tetrahedron frame according to the present invention.
Figure 25:
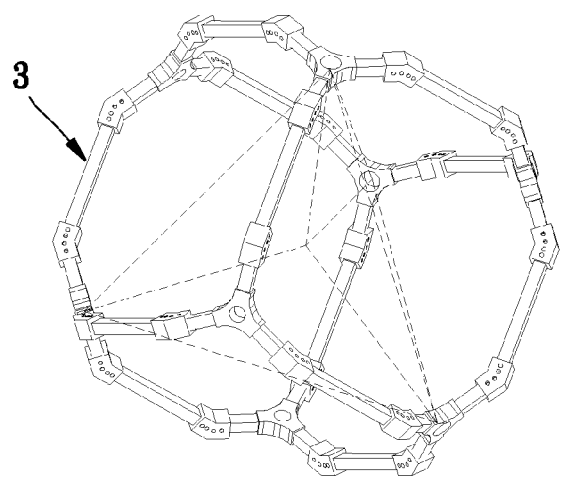
FIG. 25 is a schematic drawing of still another inner tetrahedron frame according to the present invention.

Furthermore, the outer tetrahedron frame 1 of the disclosed space orientating mechanism may be alternatively formed as a twelve-bracket frame, as shown in FIG. 24. Similarly, the inner tetrahedron frame 3 may be alternatively formed as a twelve-bracket frame, so as to provide stronger structure strength for accommodating the payload bay 4, as shown in FIG. 25. However, it is to be noted that the six-bracket frame or the twelve-bracket frame are still ruled by the geometric definition of the inner tetrahedron frame or the outer tetrahedron frame.

Figure 26:
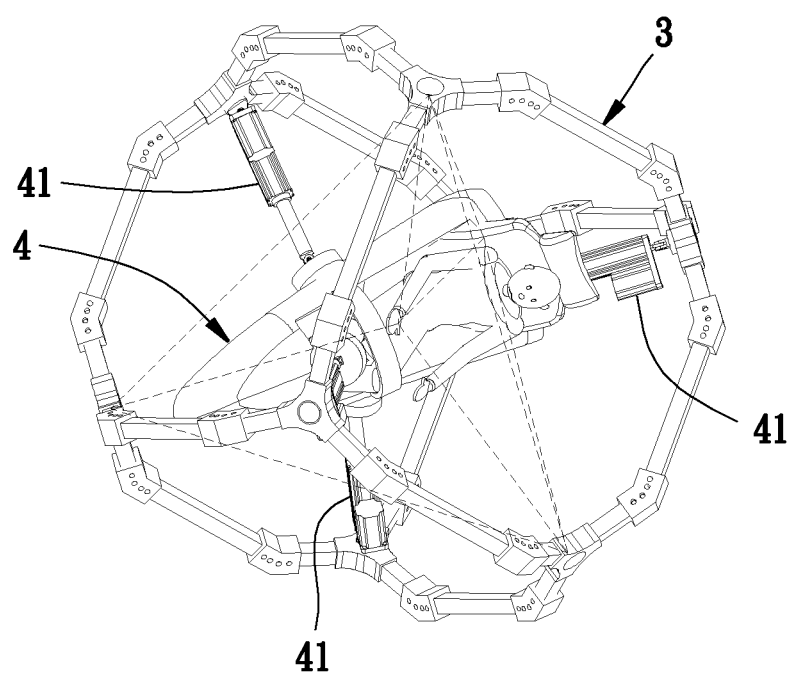
FIG. 26 is a schematic drawing of yet another inner tetrahedron frame according to the present invention.

Additionally, as shown in FIG. 26, the present invention may further have a bay carrier 42 and a plurality of linear actuators 41. The bay carrier 42 can be shaped as six-bracket frame or twelve-bracket frame. These linear actuators 41 are pivotally connected between the inner frame and the bay carrier 42. These linear actuators 41 may perform further capable of displacing and extending inside the payload bay 4.

Figure 27:
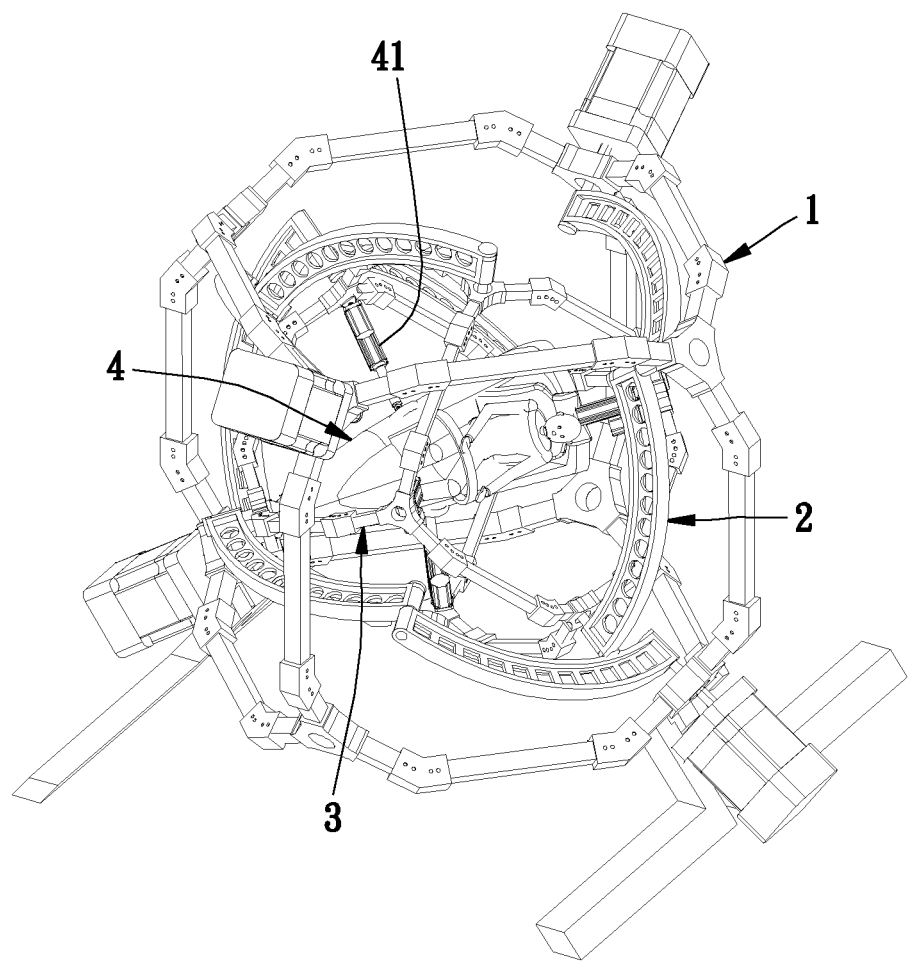
FIG. 27 is an assembled view of another preferred embodiment of the present invention.
Figure 28:
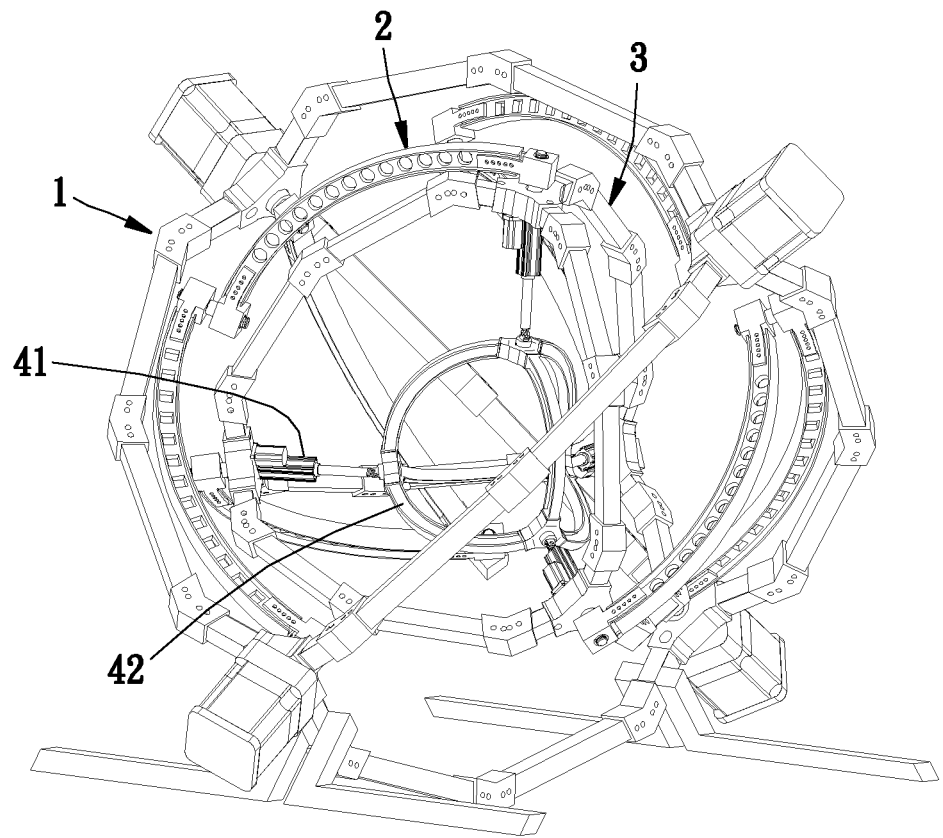
FIG. 28 is an assembled view of still another preferred embodiment of the present invention.
Figure 29:
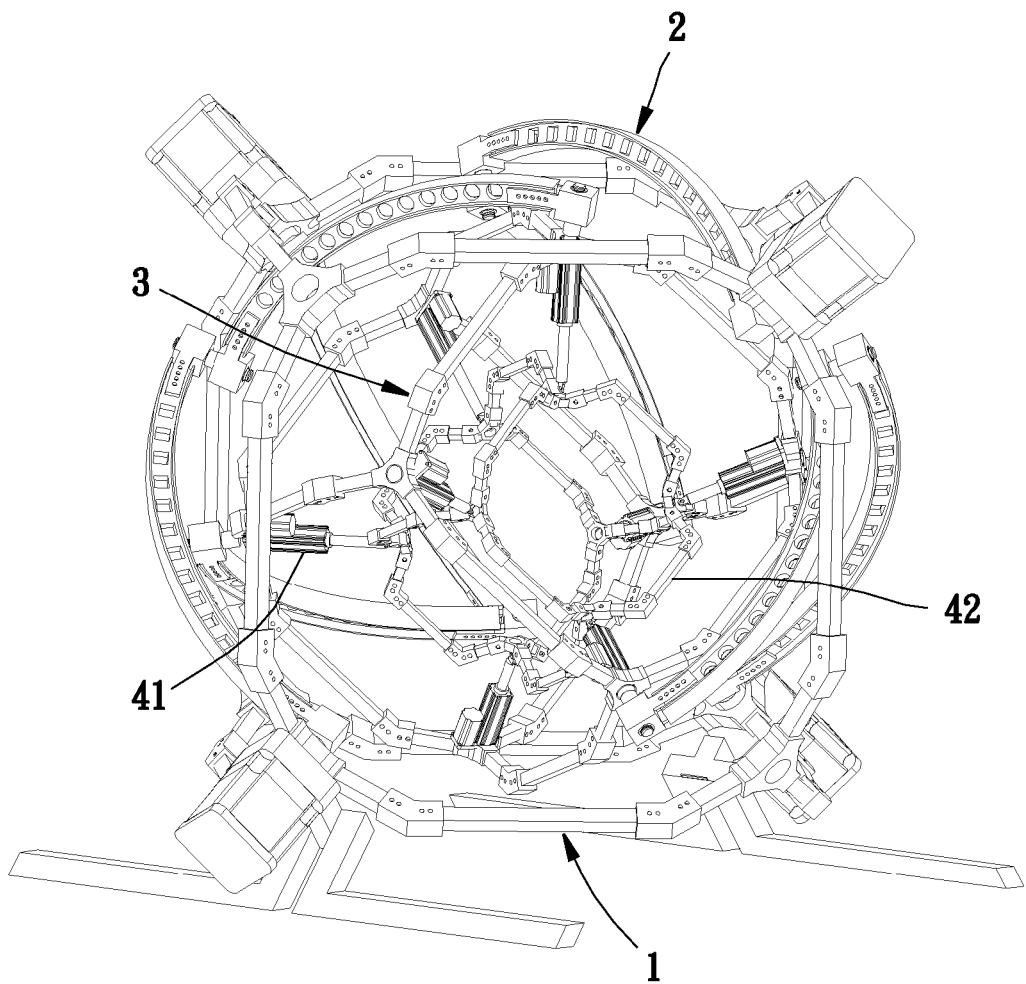
FIG. 29 is an assembled view of yet another preferred embodiment of the present invention.

The present invention may be realized as any combination of any of the recited components. For instance, another embodiment of the present invention, as shown in FIG. 27, Furthermore, a bay carrier 42 is installed inside the payload bay 4 and pivotally connected with four linear actuators 41, as shown in FIG. 28. Alternatively, a bay carrier 42 is installed inside the payload bay 4 and pivotally connected with eight linear actuators 41, as shown in FIG. 29. Therefore, the bay carrier 42 can provide its passengers with three more translational degrees of freedom, namely: heave, surge and sway, in addition to the foregoing three rotational degrees of freedom, thereby creating sudden, scary vibration and shock to the passengers.

What is claimed is:

1. A mechanism for space orientating a payload bay with at least three rotational degrees of freedom, the mechanism comprising:

an outer frame being equipped with four torque output devices, shafts of the torque output devices coinciding with concentric vertex axes of the outer frame, output shafts of the four torque output devices coinciding with the concentric vertex axes of the outer frame and being pivotally connected with four arc-link assemblies, the four arc-link assemblies being served to transfer the torques from the four torque output devices to an inner frame, each of the arc-link assemblies having an outer arc-link and an inner arc-link, which are jointed mutually with a joint axle, the outer arc-link having its outer end pivoted with each output shaft and a torque output device through an outer axle, while the inner arc-link has its inner end pivoted with a bearing seat onto the inner frame through an inner axle; and an inner frame for collecting the output of the four torque output devices transferred by the four arc-link assemblies so as to collectively reflect the output into the desired motion and posture of the payload bay, the four inner arc-links being pivotally connected to the four bearing seats at the four vertexes of the inner frame;

wherein the payload bay is installed in the inner frame, and the four arc-link assemblies serve to perform the three rotational degrees of freedom motion through the four torque output devices;

wherein the four vertexes of the outer frame are equally distant from a notional center of an outer tetrahedron;

wherein the four outer arc-links have equal radii and the inner arc-links have equal radii; in the assemblies, all the axles of the outer arc-links and the inner arc-links are concentric;

wherein the four vertexes of the inner frame are equally distant from the notional center of the inner tetrahedron;

wherein the notional center of the inner frame and the notional center of the outer frame must coincide with each other.

2. The mechanism according to claim 1, wherein the four outer arc-links are different in arc-length and the four inner arc-links are different in arc-length.

3. The mechanism according to claim 1, wherein the sum of arc-lengths of every inner arc-link and its corresponding outer arc-link must be smaller or equal to 180°, and the sum of the arc-lengths of the corresponding inner and outer arc-links must be smaller than 180°.

4. The mechanism according to claim 1, wherein the sum of the arc-lengths of any two of the outer arc-links must be greater than the included angle between their corresponding concentric vertex axes of the outer frame; if the outer frame is shaped as a regular tetrahedron, the sum of the arc-lengths of any two of the outer arc-links must be greater than 109.5°.

5. The mechanism according to claim 1, wherein the sum of the arc-lengths of any two of the inner arc-links must be greater than the included angle between their corresponding concentric vertex axes of the inner frame; if the inner frame is shaped as regular tetrahedron, the sum of the arc-lengths of any two of the inner arc-links must be greater than 109.5°.

6. The mechanism according to claim 1, wherein the inner frame is defined as a movable structure that provides the payload bay two more translational degrees of freedom as compared with the fixed inner frame that only has three rotational degrees of freedom, wherein the movable inner frame inherits geometric definition of the fixed inner frame, the included angles between each pair of concentric vertex axes of inner frame are variable.

7. The mechanism according to claim 6, wherein the linear actuators pivotally connected in the payload bay or mounted on the movable inner frame may be driven by pneumatic, hydraulic or electric motors.

8. The mechanism according to claim 1, wherein the payload bay further comprises a bay carrier and a plurality of linear actuators, the bay carrier can be shaped as six-bracket frame or twelve-bracket frame, the linear actuators are pivotally connected between the inner frame and the bay carrier, the linear actuators may perform further capable of displacing and extending inside the payload bay, the bay carrier provides with three more translational degrees of freedom, namely: heave, surge and sway, in addition to the foregoing three rotational degrees of freedom.

9. The mechanism according to claim 8, wherein the bay carrier can be shaped as six-bracket frame to pivotally connect with four linear actuators.

10. The mechanism according to claim 8, wherein the bay carrier can be shaped as twelve-bracket frame to pivotally connect with eight linear actuators.

11. The mechanism according to claim 8, wherein the linear actuators pivotally connected in the payload bay or mounted on the movable inner frame may be driven by pneumatic, hydraulic or electric motors.

* * * * *